Patented Dec. 29, 1931

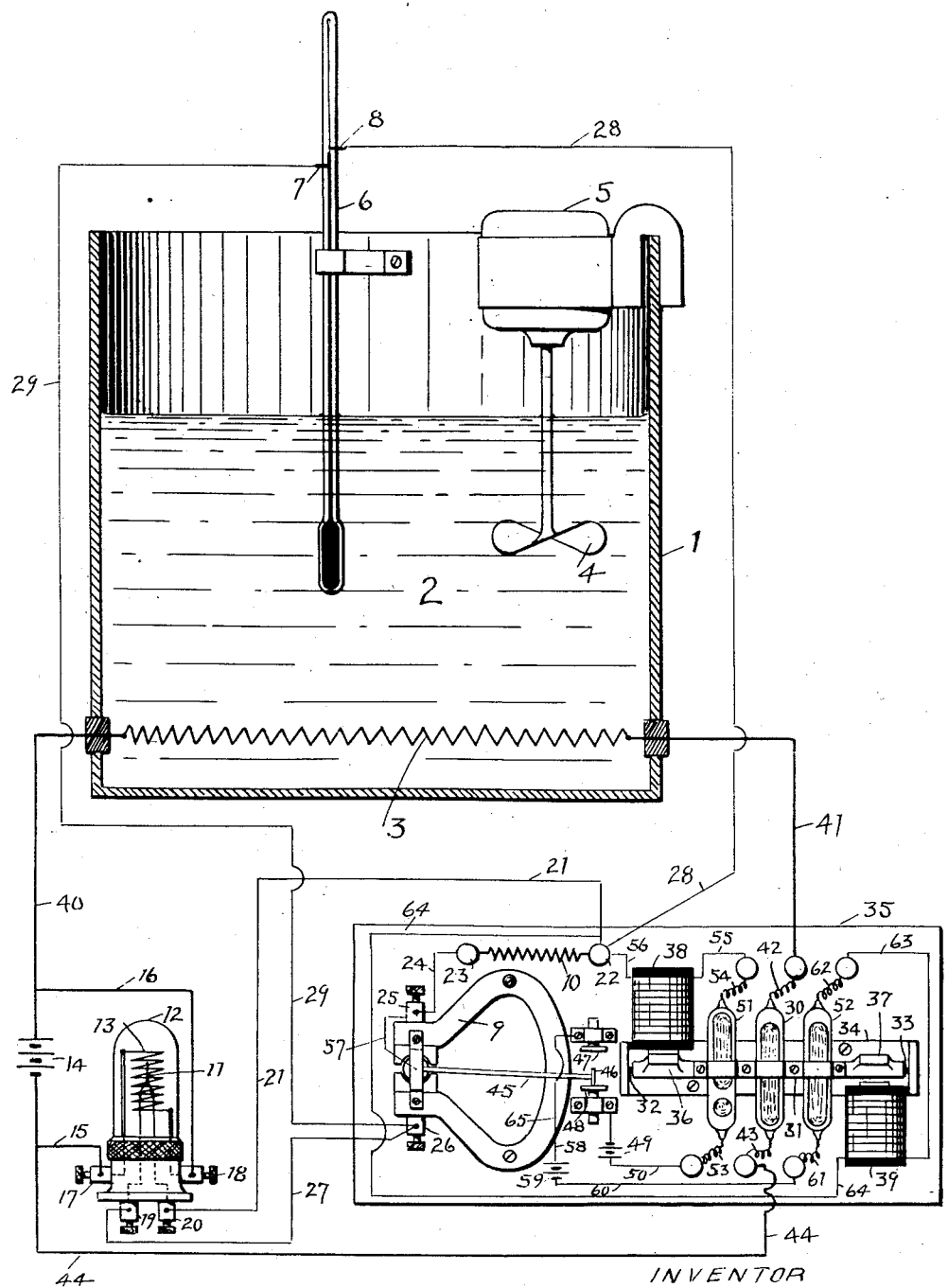

1,838,336

UNITED STATES PATENT OFFICE

FRITZ FREDERICK UEHLING, OF PASSAIC, NEW JERSEY

AUTOMATIC TEMPERATURE CONTROL DEVICE

Application filed January 13, 1930. Serial No. 420,620.

This invention relates to automatic temperature control apparatus in which the mercury in a mercurial thermometer is used to open and close an electric circuit, which circuit, directly or indirectly, actuates a novel means for automatically restricting the temperature of the medium into which the thermometer is inserted.

The mercury in the stem of a mercurial thermometer has in the past been utilized in various applications to open and close electric circuits. It has been demonstrated, however, that the reliability of electric contact between mercury in a small bore tube such as in the stem of a thermometer and a contact wire sealed into the tube, is seriously affected by the sparking and consequent corrosion which takes place between the points of contact.

The object of this invention is to provide means for creating a current, the tension of which is sufficiently low to eliminate sparking entirely, and to utilize such a current in combination with novel and reliable means for controlling the temperature of the medium into which the thermometer is inserted.

The illustration shows all of the different parts of the invention and includes a cross section of a vessel, the contents of which is to be maintained at a definite temperature, and a plan view of a special relay with all wiring etc. shown diagrammatically.

A vessel 1 contains a liquid 2 the temperature of which liquid may be decreased or increased by opening or closing an electric circuit which includes a heating coil 3 submerged in the liquid. In order to stimulate the transfer of heat, the liquid may be stirred in the customary manner by an ordinary propeller 4 driven by a motor 5. A thermometer 6 is inserted into the liquid for measuring its temperature. Two contact wires 7 and 8 are sealed into the stem of the thermometer, their purpose being to close a circuit through the mercury in the thermometer when the temperature of the liquid in the vessel reaches a predetermined degree. The object of the circuit thus closed by the mercury in the thermometer is to control directly or indirectly, the thermal energy for heating the liquid
in the vessel. Such elements as above re-
ferred to have previously been used in devices for automatically controlling temperature. Such devices have however not been a commercial success due to the eventual corrosion which takes place between the mercury in the thermometer and the contact points through which the circuit is closed.

It is a well known fact that the sparking which takes place when an electric circuit is broken is greater with high voltages and less with low voltages, furthermore when the voltage is sufficiently low there will be no visible sparking at the breaking point. It is for this reason that I utilize a thermo-couple for generating the current which passes through the thermometer, the electromotive force of which couple is so small that the circuit which includes the couple may be opened and closed indefinitely by the mercury in the thermometer without any practical effect on the mercury or the contact points. To utilize so delicate a current to control the temperature of the medium into which the thermometer is inserted, I provide a galvanometer 9, an electrical resistance 10 and a specially designed magnetic switch. The purpose of these particular parts and their relation to one another I will presently describe.

A thermo-couple 11 is sealed into a bulb 12. The couple is heated by an electric heating coil 13 which surrounds the couple. The coil or heater 13 is heated by current from any source, as from a battery 14 through wires 15 and 16 and binding posts 17 and 18 respectively. The thermo-couple 11 which is electrically insulated from the heater, communicates with terminals or binding posts 19 and 20, as illustrated. The current from the thermo-couple leaves the binding post 20, passes through wire 21 to a binding post 22, from binding post 22 through the resistance 10 to a binding post 23, from binding post 23 through wire 24 to binding post 25, and thence through the galvanometer and back to the thermo-couple through binding post 26, wire 27 and binding post 19.

The circuit which includes the mercury in the thermometer leaves the thermo-couple through binding post 20, thence through wires 21 and 28 to contact wire 8, and when the mercury in the thermometer touches the contact wire 8, through the mercury to contact wire 7, and thence through wires 29, 27 and binding post 19 back to the couple. It will be noted that when the mercury closes the circuit between the contact wires 7 and 8, part of the current from the thermo-couple 11 will be short circuited through this circuit thus allowing less current to flow from the thermocouple through the galvanometer. In other words the needle of the galvanometer will deflect more or less depending upon whether the circuit through the contact wires 7 and 8 of the thermometer is opened or closed by the mercury in the thermometer. The manner in which I utilize this change in deflection as governed by the position of the mercury in the thermometer will be presently described.

The circuit which includes the heater 3 is opened and closed by a mercurial switch 30 mounted on a tiltable frame 31. The tiltable frame 31 is pivoted at 32 and 33 and is supported by a bracket 34 fastened to a base 35. The tiltable frame is provided with armatures 36 and 37 which react respectively with electro magnets 38 and 39. The mercury switch 30 is so placed on the tiltable frame 31, that when the frame has been tilted by the magnet 38, the circuit through the switch 30 will be closed, and when the frame has been tilted by the magnet 39, the circuit through the switch will be open. The circuit which includes the mercury switch 30 starts at battery 14 passes through wire 40 to heater 3, and from heater 3, through wire 41, a flexible connection 42, the switch 30, a flexible connection 43 and wire 44 back to the battery 14.

In addition to the mercury switch 30 there are also two other mercury switches 51 and 52 fastened to the tiltable frame 31. The switch 51 is so placed on the frame, that after it has been tilted by the magnet 38, it will be open, and after it has been tilted by magnet 39, it will be closed. The mercury switch 52 is on the other hand so placed on the tiltable frame 31, that after it has been tilted by magnet 39, it will be open, and after it has been tilted by magnet 38 it will be closed. The mercury switches 51 and 52 are respectively in series with the magnets 38 and 39 and their operation will be described in connection with certain circuits which are closed by the deflection of the galvanometer needle 45.

The indicating needle 45 of the galvantometer 9 is provided with a contact pin 46 which makes electrical contact with a contact disc 47 or a contact disc 48 depending upon the direction in which the needle is deflected. When the pin 46 makes contact with the disc 48, as illustrated, the circuit which includes the magnet 38 will be closed. This circuit starts at battery 49, passes through wire 50, a flexible connection 53, mercury switch 51, a flexible connection 54 and a wire 55 to magnet 38, from magnet 38 through wire 56 to binding post 22, thence through the resistance 10 to binding post 23, from binding post 23 through wires 24 and 57 to needle 45, and from needle 45 through pin 46, to disc 48 and thence back to battery 49.

In like manner when the pin 46 makes contact with the disc 47, the circuit which includes the magnet 39 will be closed. This circuit starts at battery 59, passes through wire 60, a flexible connection 61, mercury switch 52, a flexible connection 62, and wire 63 to magnet 39, from magnet 39 through wire 64 to binding post 22, thence through the resistance 10 to binding post 23, from binding post 23 through wires 24 and 57 to needle 45, and from needle 45, when the pin 46 touches the disc 47, through wire 65 back to battery 59.

It is a well known fact that electric contact between the delicate needle of a galvanometer, such as 45 and contact pieces, such as 47 and 48, is most unreliable and therefore very impractical. To insure sufficient electric contact between such a light and delicate needle and another contact surface it becomes necessary to eliminate sparking entirely and at the same time to provide sufficient pressure between the two contact surfaces. This I accomplish by means of the resistance 10 in combination with the mercury switches 51 and 52 all in a manner which I am about to describe.

With the electric contact between wire 7 and wire 8 of the thermometer broken, as illustrated, all of the current from the thermo-couple 11 will pass through the galvanometer thus deflecting the needle 45 in a clockwise direction until contact pin 46 touches contact disc 48. It is obvious that the slightest contact between the pin 46 and the disc 48 will cause some flow of current through the circuit which includes the magnet 38. This circuit which also includes the resistance 10 has already been traced. Although the initial delicate contact between the pin 46 and the disc 48 may not be sufficient to cause an electric flow that will actuate magnet 38 it will nevertheless cause some drop in potential across the resistance 10. This drop across the resistance will cause some current to flow from binding post 22 through wire 21 and binding post 20 to thermo-couple 11 from the thermo-couple through binding post 19 and wire 27 to binding post 26 of the galvanometer from binding post 26 through the galvanometer to binding post 25 and thence through wire 24 and binding post 23 back to the resistance. The polarity of the battery 49 is such that the drop across the resistance 10 will cause a flow through the circuit just described and in the proper direction to force the pin 46 tighter against the disc 48. The increased force between the pin 46 and disc 48 will in turn increase the flow through the magnet 38 and the resistance 10. The drop across the resistance 10 will obviously also increase, thereby increasing the flow through the galvanometer which will again increase the pressure between the pin 46 and the disc 48. In other words as soon as there is the slightest contact between the pin 46 and the disc 48 the drop across the resistance 10 will in the manner stated, cause the pin 46 to be forced tighter and tighter against the disc 48 until sufficient current flows through the magnet 38 to attract the armature 36. The attraction between this magnet and its armature 36 will tilt the frame 31 to which all of the mercury switches are fastened. In this tilted position as previously stated the contact through the mercury in switch 51 will be broken and the circuit through magnet 38 and resistance 10 will be open. When this circuit is open, there will be no drop across the resistance 10 and the needle 45 will be free from deflection in either direction depending only upon the electro-motive force of the couple 11.

On the other hand, when the mercury in the thermometer rises sufficiently high to close the circuit through contact wires 7 and 8, then some of the current from the couple 11 will be short-circuited away from the galvanometer in the manner already stated. Under this condition less current will flow through the galvanometer and the needle 45 will deflect in a counter-clockwise direction until the pin 46 touches the disc 47. The slightest contact between the pin 48 and the disc 47 will cause some flow of current through the circuit which includes the magnet 39. This circuit which also includes the resistance 10, has already been traced. Although the initial delicate contact between the pin 46 and the disc 47 may not be sufficient to cause an electric flow that will actuate magnet 39, it will neverthless cause some drop in potential across the resistance 10. This drop will cause some current to flow from binding post 23 through wire 24 and binding post 25, thence through the galvanometer to binding post 26, from binding post 26 through wire 27 and binding post 19 to thermo-couple 11, and from the thermo-couple back to the resistance 10 through binding post 20, wire 21 and binding post 22. The polarity of battery 59 is opposite to that of battery 49, and such that when the circuit is closed through magnet 39, the drop across the resistance 10 will cause a flow through the circuit just described, and in the proper direction to force the pin 46 tighter against the disc 47. The increased force between the pin and the disc 47 will in turn increase the flow through the magnet 39 and the resistance 10. The drop across the resistance will obviously also increase, thereby increasing the flow through the galvanometer which will again increase the pressure between the pin 46 and the disc 47. In other words as soon as there is the slightest contact between the pin 46 and the disc 47, the drop across the resistance 10 will, in the manner stated, cause the pin to be forced tighter and tighter against the disc 47 until sufficient current flows through the magnet 39 to attract the armature 37. The attraction between this magnet and its armature 37 will tilt the frame 31 to which all of the mercury switches are fastened. In this tilted position, as previously stated, the contact through the mercury in switch 52 will be broken, and the circuit through the magnet 39 and resistance 10 will be open. When this circuit is open, there will obviously be no drop across the resistance 10. There will be no additional force to hold the needle 45 against the disc 47, and the needle will therefore be free to deflect in either direction depending only upon the electro-motive force of the thermo-couple 11.

It follows from the above description that when the temperature of the liquid 2 is below the temperature determined by the contact wire 8 in the stem of the thermometer 6, then none of the current from the thermo-couple 11 will be shunted away from the galvanometer. All of the current from the thermo-couple will thus pass through the galvanometer which is sufficient to deflect the needle 45 in a clockwise direction until the pin 46 touches the contact disc 48. When the pin 46 touches the disc 48, the circuit through the mercury switch 51, magnet 38 and resistance 10 will be closed. The drop across the resistance 10 due to the polarity of battery 59 will in the manner stated tend to deflect the needle 45 still further in a clockwise direction thereby increasing the pressure between pin 46 and disc 48 until the current through magnet 38 is sufficient to tilt the mercury switches toward the magnet. When this has been accomplished, the circuit which includes the disc 48 and magnet 38 will be broken in the mercury switch 51, contact will be established through the mercury switch 52, and the circuit which includes the heating coil 3 will be closed through the mercury switch 30. The heater 3 will therefore build up the temperature of the liquid 2 until the mercury in the thermometer 6 closes the circuit through the contact wires 7 and 8. Immediately that this circuit is closed, some of the current from the thermo-couple will be shunted away from the galvanometer in the manner already stated. This will cause the needle 45 to deflect in a counter-clockwise direction until the pin 46 touches the disc 47. When the pin 46 touches the disc 47, the circuit through the mercury switch 52, magnet 39 and resistance 10 will be closed. The drop across the resistance 10 due to the polarity of battery 49 will, in the manner already stated, tend to deflect the needle still further in a counter-clockwise direction thereby increasing the pressure between the pin 46 and disc 47 until the current through the magnet 39 is sufficient to tilt the mercury switches toward the magnet. When this has been accomplished, the circuit which includes the disc 47 and the magnet 39 will be broken in the mercury switch 52, contact will again have been established through the mercury in switch 51, and the circuit which includes the heating element 3 will be opened through the mercury switch 30. The heat input will thus discontinue, the temperature of the liquid 3 will drop until the circuit through the contact pieces 7 and 8 is again broken at which time the heating element will again be turned on until the temperature has again risen sufficiently to close the circuit through 7 and 8. This cycle will obviously repeat itself thereby maintaining the temperature of the liquid 2 constant within very narrow limits.

Although I have chosen to heat the thermo-couple 11 by an electric heating coil 12, it is obvious that the couple may be heated by any other heating means that will provide a reasonably constant temperature. Furthermore any other form of heating element may be substituted for the heating coil 3. Although I have confined this description to one particular form of the invention it is obvious that there may be many variations in the form and combination of the various elements, as well as in their specific application without in any way departing from the invention itself.

Having thus described my invention, what I claim as new and desire to secure by Letters Patent is:

1. In a device of the class described, the combination with a galvanometer having an indicating needle, an electric contact piece with which the needle makes contact, an electrical resistance, an electric circuit which includes the resistance, the needle and the contact piece, a thermo-couple, an electric circuit which includes the thermo-couple, the resistance and the galvanometer, a mercurial thermometer, and an electric circuit which includes the thermo-couple and the mercury in the thermometer.

2. In a device of the class described, the combination with a galvanometer having an indicating needle, an electric contact piece with which the needle makes contact when it deflects in one direction, a second electric contact piece with which the needle makes contact when it deflects in the opposite direction, an electrical resistance, an electric circuit which includes the resistance, the needle and the first contact piece, an electric circuit which includes the resistance, the needle and the second contact piece, a thermo-couple, an electric circuit which includes the thermo-couple, the resistance and the galvanometer, a mercurial thermometer, an electric circuit which includes the mercury in the thermometer and the thermo-couple, and means for heating the thermo-couple.

3. In a device of the class described, the combination with an electric circuit, of electrical means for closing the circuit, electrical means for opening the circuit, a galvanometer having an indicating needle, an electric contact piece with which the needle makes contact when it deflects in one direction, a second electric contact piece with which the needle makes contact when it deflects in the opposite direction, an electrical resistance, a second electric circuit which includes the resistance, the needle, the first contact piece and the electrical means for closing the first circuit, a third electric circuit which includes the resistance, the needle, the second contact piece and the electrical means for opening the first circuit, a thermo-couple, a fourth electric circuit which includes the thermo-couple, the resistance and the galvanometer, a mercurial thermometer, and a fifth circuit which includes the thermo-couple and the mercury in the thermometer.

4. In a device of the class described, the combination with a thermo-couple, of an electric heater for heating the thermo-couple, a bulb for hermetically sealing the thermo-couple and the heater, a galvanometer, an electric circuit which includes the galvanometer and the thermo-couple, and means for short circuiting some of the current from the thermo-couple, said means consisting of a mercurial thermometer with electric contacts sealed into the stem of the thermometer.

5. In a device of the class described, the combination with a mercurial thermometer, of an electric circuit, a switch for opening or closing the electric circuit, electrical means for opening the switch, electrical means for closing the switch, a galvanometer with an indicating needle, an electric contact piece with which the needle makes contact when it deflects in one direction, a second electric contact piece with which the needle makes contact when it deflects in the opposite direction, an electrical resistance, an electric circuit which includes the resistance, the needle, the first contact piece and the means for opening the switch, an electric circuit which includes the resistance, the needle, the second contact piece, and the means for closing the switch, a thermo-couple, an electric circuit which includes the thermo-couple, the resistance and the galvanometer, and electrical contacts in the thermometer for short circuiting some of the current from the thermo-couple when the mercury in the thermometer reaches a predetermined point.

6. In a device of the class described, the combination with a tiltable frame, of a mercury switch fastened to the frame, an electric circuit which may be opened or closed by the mercury switch, an electro-magnet for tilting the frame in one direction, a second electro-magnet for tilting the frame in the opposite direction, a galvanometer having an indicating needle, an electric contact piece with which the needle makes contact when deflected in one direction, a second electric contact piece with which the needle makes contact when deflected in the opposite direction, an electrical resistance, an electric circuit which includes the first magnet, the first contact piece, the needle and the resistance, a second electric circuit which includes the second magnet, the second contact piece, the needle, and the resistance, a thermo-couple in series with the resistance for deflecting the needle, and means for short circuiting the thermo-couple which includes the mercury in a mercurial thermometer.

7. In a device of the class described, the combination with a mercury switch fastened to a tiltable frame, of a second mercury switch and a third mercury switch mounted on the tiltable frame, electrical means for tilting the frame to open the first switch and close the second and third switches, electrical means for tilting the frame to close the first switch and open the second and third switches, a galvanometer having an indicating needle, an electric contact piece with which the needle makes contact when deflected in one direction, a second contact piece with which the needle makes contact when deflected in the opposite direction, an electrical resistance, an electric circuit which includes the resistance, the needle, the first contact piece, the first switch and the first tilting means, and a second electric circuit which includes the resistance, the needle, the second contact piece, the third switch and the second tilting means.

8. In a device of the class described, the combination with three electric switches, of electrical means for simultaneously opening the first switch and closing the second and third switches, electrical means for a simultaneously closing the first switch and opening the second and third switches, a galvanometer having an indicating needle, an electric contact piece with which the needle makes contact when deflected in one direction, a second electric contact piece with which the needle makes contact when deflected in the opposite direction, an electrical resistance, an electric circuit which includes the resistance, the needle, the first contact piece, the first switch and the first electrical means, an electric circuit which includes the resistance, the needle, the second contact piece, the third switch and the second electrical means, an electric circuit which includes the second switch, a thermo-couple, an electric circuit which includes the thermo-couple, the resistance and the galvanometer, and an electric circuit which includes the thermo-couple and the mercury of a mercurial thermometer.

9. In a device of the class described, the combination with three electric switches, of an electro-magnet for simultaneously opening the first switch and closing the second and third switches, a second electro-magnet for simultaneously closing the first switch and opening the second and third switches, a galvanometer, an arm which is deflected by current passing through the galvanometer, a contact piece with which the arm contacts when deflected in one direction, a second contact piece with which the arm contacts when deflected in the opposite direction, an electrical resistance, a thermo-couple, an electric circuit which includes the resistance, the galvanometer and the thermo-couple, a mercurial thermometer, a second electric circuit which includes the mercury in the thermometer and the thermo-couple, a third electric circuit which includes the second switch, a fourth electric circuit which includes the resistance, the arm, the first contact piece, the first switch and the first magnet, and a fifth electric circuit which includes the resistance, the arm, the second contact piece, the third switch and the second magnet.

10. In a device of the class described, the combination with three electric switches, of an electro-magnet for simultaneously opening the first switch and closing the second and third switches, a second electro-magnet for simultaneously closing the first switch and opening the second and third switches, a galvanometer, an arm which is deflected by current passing through the galvanometer, a contact piece with which the arm contacts when deflected in one direction, a second contact piece with which the arm contacts when deflected in the opposite direction, an electrical resistance, a thermo-couple, an electric circuit which includes the resistance, the galvanometer and the thermo-couple, a mercurial thermometer, a second electric circuit which includes the mercury in the thermometer and the thermo-couple, a third electric circuit which includes the second switch, a fourth electric circuit which includes the resistance, the arm, the first contact piece, the first switch and the first magnet, a fifth electric circuit which includes the resistance, the arm, the second contact piece, the third switch and the second magnet, a battery in the fourth circuit to cause current to flow through the resistance in one direction, and a battery in the fifth circuit to cause current to flow through the resistance in the opposite direction.

11. In a device of the class described, the combination with a tiltable frame, of an electro-magnet for tilting the frame in one direction, a second electro-magnet for tilting the frame in the opposite direction, a mercury switch fastened to the tiltable frame said switch being open when tilted by the first magnet and closed when tilted by the second magnet, a second mercury switch fastened to the tiltable frame, a third mercury switch fastened to the tiltable frame, both of said second and third switches being closed when tilted by the first magnet and open when tilted by the second magnet, a galvanometer having an indicating needle, an electric contact piece with which the needle makes contact when deflected in one direction, a second electric contact piece with which the needle makes contact when deflected in the opposite direction, an electrical resistance, an electric circuit which includes the resistance, the needle, the first contact piece, the first mercury switch, the first magnet and a battery of the proper polarity to cause a drop across the resistance in a definite direction, a second electric circuit which includes the resistance, the needle, the second contact piece, the third mercury switch, the second magnet and a battery of the proper polarity to cause a drop across the resistance opposite to that caused by the first circuit, a thermo-couple, a third circuit which includes the resistance, the galvanometer and the thermo-couple, the direction of flow through said third circuit depending upon the drop across the resistance, a mercurial thermometer, a fourth circuit which includes the thermometer and the thermo-couple and which may be opened or closed by the contraction and expansion of the mercury in the thermometer, and a fifth electric circuit which includes the second mercury switch.

12. In a device of the class described, the combination with a tiltable frame, of an electro-magnet for tilting the frame in one direction, a second electro-magnet for tilting the frame in the opposite direction, a mercury switch fastened to the tiltable frame said switch being open when tilted by the first magnet and closed when tilted by the second magnet, a second mercury switch fastened to the tiltable frame, a third mercury switch fastened to the tiltable frame, both of said second and third switches being closed when tilted by the first magnet and open when tilted by the second magnet, a galvanometer having an indicating needle, an electric contact piece with which the needle makes contact when deflected in one direction, a second electric contact piece with which the needle makes contact when deflected in the opposite direction, an electrical resistance, an electric circuit which includes the resistance, the needle, the first contact piece, the first mercury switch, the first magnet and a battery of the proper polarity to cause a drop across the resistance, in a definite direction, a second electric circuit which includes the resistance, the needle, the second contact piece, the third mercury switch, the second magnet and a battery of the proper polarity to cause a drop across the resistance opposite to that caused by the first circuit, a thermo-couple, a third circuit which includes the resistance, the galvanometer and the thermo-couple, the direction of flow through said third circuit depending upon the drop across the resistance, a mercurial thermometer, a fourth circuit which includes the thermometer and the thermo-couple and which may be opened or closed by the contraction and expansion of the mercury in the thermometer, a fifth electric circuit which includes the second mercury switch, electrical means for heating the thermo-couple and a bulb which hermetically seals the thermo-couple and the thermo-couple heating means.

13. In a device of the class described, the combination with an electric circuit of a relay for opening or closing the circuit, a thermo-couple, means for heating the thermo-couple, means for shunting more or less current away from the thermo-couple, and means for actuating the relay, said actuating means being controlled by the shunting means.

14. In a device of the class described, the combination with a galvanometer having an indicating needle, an electric contact piece with which the needle makes contact when it deflects in one direction, a second electric contact piece with which the needle makes contact when it deflects in the opposite direction, an electrical resistance, an electric circuit which includes the resistance, the needle and the first contact piece, a second electric circuit which includes the resistance, the needle and the second contact piece, a battery of a given polarity in the first circuit, a battery of opposite polarity in the second circuit, a thermo-couple, a third electric circuit which includes the thermo-couple, the resistance and the galvanometer, a mercurial thermometer, a fourth electric circuit which includes the mercury in the thermometer and the thermo-couple, and means for heating the thermo-couple.

15. In a device of the class described, the combination with an electric circuit, of a relay for opening and closing the circuit, a thermo-couple for actuating the relay, a second circuit which includes the relay and the couple, a mercurial thermometer containing mercury and electric contact wires, a third circuit which includes the mercury, the contact wires and the couple, and means for heating the couple independently of the thermometer.

FRITZ FREDERICK UEHLING.